United States Patent [19]

Shimizu

[11] Patent Number: 4,769,812
[45] Date of Patent: Sep. 6, 1988

[54] TIME DIVISION SWITCHING SYSTEM HAVING A PRIORITY SELECTOR RESPONSIVE TO PROCEED-TO-SEND REQUESTS

[75] Inventor: Hiroshi Shimizu, Tokyo, Japan
[73] Assignee: NEC Corporation, Tokyo, Japan
[21] Appl. No.: 871,037
[22] Filed: Jun. 5, 1986

[30] Foreign Application Priority Data

Jun. 5, 1985 [JP] Japan .................................. 60-122224
Jun. 5, 1985 [JP] Japan .................................. 60-122225
Jun. 6, 1985 [JP] Japan .................................. 60-121496
Jun. 6, 1985 [JP] Japan .................................. 60-121497

[51] Int. Cl.[4] ........................................... H04Q 11/04
[52] U.S. Cl. ..................................................... 370/67
[58] Field of Search ...................... 370/66, 67, 80, 81, 370/85, 95, 58

[56] References Cited

U.S. PATENT DOCUMENTS 4,287,590 9/1981 Boute et al. ............................ 370/67

Primary Examiner—Douglas W. Olms
Assistant Examiner—Wellington Chin
Attorney, Agent, or Firm—Sughrue, Mion, Zinn, Macpeak & Seas

[57] ABSTRACT

Disclosed is a time division switching system wherein a plurality of line circuits generate a proceed-to-send request in response to a data block received from the associated terminal station and a destination address. A clock-synchronous selecting circuit operates at clock intervals for selecting one of the addresses of the line circuits which are generating the proceed-to-send requests according to a predetermined sequence of priorities so that the selected address exists for a time interval which is an integral multiple of the clock interval. A switching network is responsive to the selected address and the destination address for distributing data blocks from the line circuit of the selected address to the line circuit of the destination address through a common bus.

22 Claims, 23 Drawing Sheets

FIG.5

| | ROM 112 INPUTS | | | | | ROM 112 OUTPUTS | |
|---|---|---|---|---|---|---|---|
| | 113-2 | 113-1 | 62 | 52 | 42 | 111-2 | 111-1 |
| 1 | 0 | 0 | 0 | 0 | 0 | 0 | 0 |
| 2 | 0 | 0 | 0 | 0 | 1 | 0 | 1 |
| 3 | 0 | 0 | 0 | 1 | * | 1 | 0 |
| 4 | 0 | 0 | 1 | * | * | 1 | 1 |
| 5 | 0 | 1 | 0 | 0 | 0 | 0 | 0 |
| 6 | 0 | 1 | * | * | 1 | 0 | 1 |
| 7 | 0 | 1 | 0 | 1 | 0 | 1 | 0 |
| 8 | 0 | 1 | 1 | * | 0 | 1 | 1 |
| 9 | 1 | 0 | 0 | 0 | 0 | 0 | 0 |
| 10 | 1 | 0 | 0 | 0 | 1 | 0 | 1 |
| 11 | 1 | 0 | * | 1 | * | 1 | 0 |
| 12 | 1 | 0 | 1 | 0 | * | 1 | 1 |
| 13 | 1 | 1 | 0 | 0 | 0 | 0 | 0 |
| 14 | 1 | 1 | 0 | 0 | 1 | 0 | 1 |
| 15 | 1 | 1 | 0 | 1 | * | 1 | 0 |
| 16 | 1 | 1 | 1 | * | * | 1 | 1 |

FIG.6

| | ROM 112 INPUTS | | | | | ROM 112 OUTPUTS | |
|---|---|---|---|---|---|---|---|
| | 113-2 | 113-1 | 62 | 52 | 42 | 111-2 | 111-1 |
| 1 | 0 | 0 | 0 | 0 | 0 | 0 | 0 |
| 2 | 0 | 0 | 0 | 0 | 1 | 0 | 1 |
| 3 | 0 | 0 | 0 | 1 | * | 1 | 0 |
| 4 | 0 | 0 | 1 | * | * | 1 | 1 |
| 5 | 0 | 1 | 0 | 0 | 0 | 0 | 0 |
| 6 | 0 | 1 | 0 | * | 1 | 0 | 1 |
| 7 | 0 | 1 | 0 | 1 | 0 | 1 | 0 |
| 8 | 0 | 1 | 1 | * | * | 1 | 1 |
| 9 | 1 | 0 | 0 | 0 | 0 | 0 | 0 |
| 10 | 1 | 0 | 0 | 0 | 1 | 0 | 1 |
| 11 | 1 | 0 | 0 | 1 | * | 1 | 0 |
| 12 | 1 | 0 | 1 | * | * | 1 | 1 |
| 13 | 1 | 1 | 0 | 0 | 0 | 0 | 0 |
| 14 | 1 | 1 | 0 | 0 | 1 | 0 | 1 |
| 15 | 1 | 1 | 0 | 1 | * | 1 | 0 |
| 16 | 1 | | 1 | * | * | 1 | 1 |

FIG.7

| | \multicolumn{5}{c}{ROM 112 INPUTS} | \multicolumn{2}{c}{ROM 112 OUTPUTS} |
| --- | --- | --- | --- | --- | --- | --- | --- |
| | 113-2 | 113-1 | 62 | 52 | 42 | 111-2 | 111-1 |
| 1 | 0 | 0 | 0 | 0 | 0 | 0 | 0 |
| 2 | 0 | 0 | 0 | 0 | 1 | 0 | 1 |
| 3 | 0 | 0 | 0 | 1 | * | 1 | 0 |
| 4 | 0 | 0 | 1 | * | * | 1 | 1 |
| 5 | 0 | 1 | 0 | 0 | 0 | 0 | 0 |
| 6 | 0 | 1 | 0 | 0 | 1 | 0 | 1 |
| 7 | 0 | 1 | * | 1 | * | 1 | 0 |
| 8 | 0 | 1 | 1 | 0 | * | 1 | 1 |
| 9 | 1 | 0 | 0 | 0 | 0 | 0 | 0 |
| 10 | 1 | 0 | 0 | * | 1 | 0 | 1 |
| 11 | 1 | 0 | 0 | 1 | 0 | 1 | 0 |
| 12 | 1 | 0 | 1 | * | * | 1 | 1 |
| 13 | 1 | 1 | 0 | 0 | 0 | 0 | 0 |
| 14 | 1 | 1 | * | * | 1 | 0 | 1 |
| 15 | 1 | 1 | * | 1 | 0 | 1 | 0 |
| 16 | 1 | 1 | 1 | 0 | 0 | 1 | 1 |

TO NETWORK 2 (FIG.23)

4,769,812

TIME DIVISION SWITCHING SYSTEM HAVING A PRIORITY SELECTOR RESPONSIVE TO PROCEED-TO-SEND REQUESTS

BACKGROUND OF THE INVENTION

The present invention relates to a time division switching systems, and more specifically to a time division switching system which allows efficient utilization of time slots.

Advances in digital technologies have prompted the tendency toward the integration of voice and data switching services by a common time division switching system, and this tendency is particularly acute in digital private branch exchanges (PBX). A typical example of such PBX systems is shown and described in U.S. Pat. No. 4,253,179. In this switching system, a central controller accepts a service request originated by a line circuit and proceeds to write the address pair of originating and terminating line circuits into a sequentially addressable location of a control memory. An address counter is driven by a clock source to sequentially read and stored address pairs out of the memory into decoders for assigning a time slot to the line circuits of the address pair on a common bus of a switching network. This pathway is maintained until a clear request is deposited on the central controller. Although satisfactory for switching speech signals, the time slot utilization of the prior art switching system is not satisfactory for switching burst-type signals such as computer data. Another disadvantage is that the transmission capacity of the pathway is limited to a constant value, typically 64 Kbps, and as a result the system is not suitable for switching high-speed data.

SUMMARY OF THE INVENTION

It is therefore an object of the present invention to provide a time division switching system which is capable of highly efficient utilization of time slots.

According to one aspect of the invention, the time division switching system comprises a plurality of line circuits associated respectively with terminal stations. The line circuits have individually indentifiable addresses and generates a destination address followed by a proceed-to-send request in response to a data block received from the associated terminal station. A clock-synchronous selecting circuit is provided to operate at clock intervals for selecting, according to a predetermined sequence of priorities, one of the addresses of the line circuits which are generating proceed-to-send requests so that the selected address exists for a variable time interval which is an integral multiple of the clock interval. A switching network is responsive to the selected address and the destination address for distributing the data block from the line circuit of the selected address to the line circuit of the destination address through the common bus.

Preferably, the selecting circuit comprises an originating address memory storing the addresses of the line circuits, a latch, and a clock source for clocking the latch. The latch has an input connected to the output of the originating address memory and an output which is combined with the proceed-to-send requests from the line circuits to produce an address input of the originating address memory for reading one of the stored addresses according to different levels of priority respectively given to the line circuits.

Each of the line circuits may include means for generating a service request in response to a request for communication from the associated terminal station. Preferably, the system includes a destination address memory, and a writing circuit responsive to the service request for storing a destination address given by the originating line circuit into a location of the destination address memory addressable as a function of the selected address. The clock-synchronous selecting circuit reads the stored address out of the destination address memory as a function of the selected address into the switching network.

According to a second aspect of the invention, the time division switching system comprises a plurality of individual-access line circuits associated respectively with terminal stations for generating a service request in response to a request for originating a communication received from the associated terminal station. A plurality of multiple-access line circuits are provided which are associated respectively with terminal stations for generating a multiple-access destination address. A time slot assigning circuit periodically assigns a first time slot to the originating individual-access line circuit and to an individual-access line circuit participating in the communication. An idle time slot detector is provided for detecting a second, idle time slot in which the individual-access line circuits are not assigned and assigning the second time slot to the multiple-access line circuit generating the multiple-access destination address. A switching network distributes the assigned first and second time slots on a common bus.

BRIEF DESCRIPTION OF THE DRAWINGS

The present invention will be described in further detail with reference to the accompanying drawings, in which:

FIGS. 5 to 7 are illustrations of the priority schemes of the originating line selector of FIG. 2;

DETAILED DESCRIPTION

Figure 1:
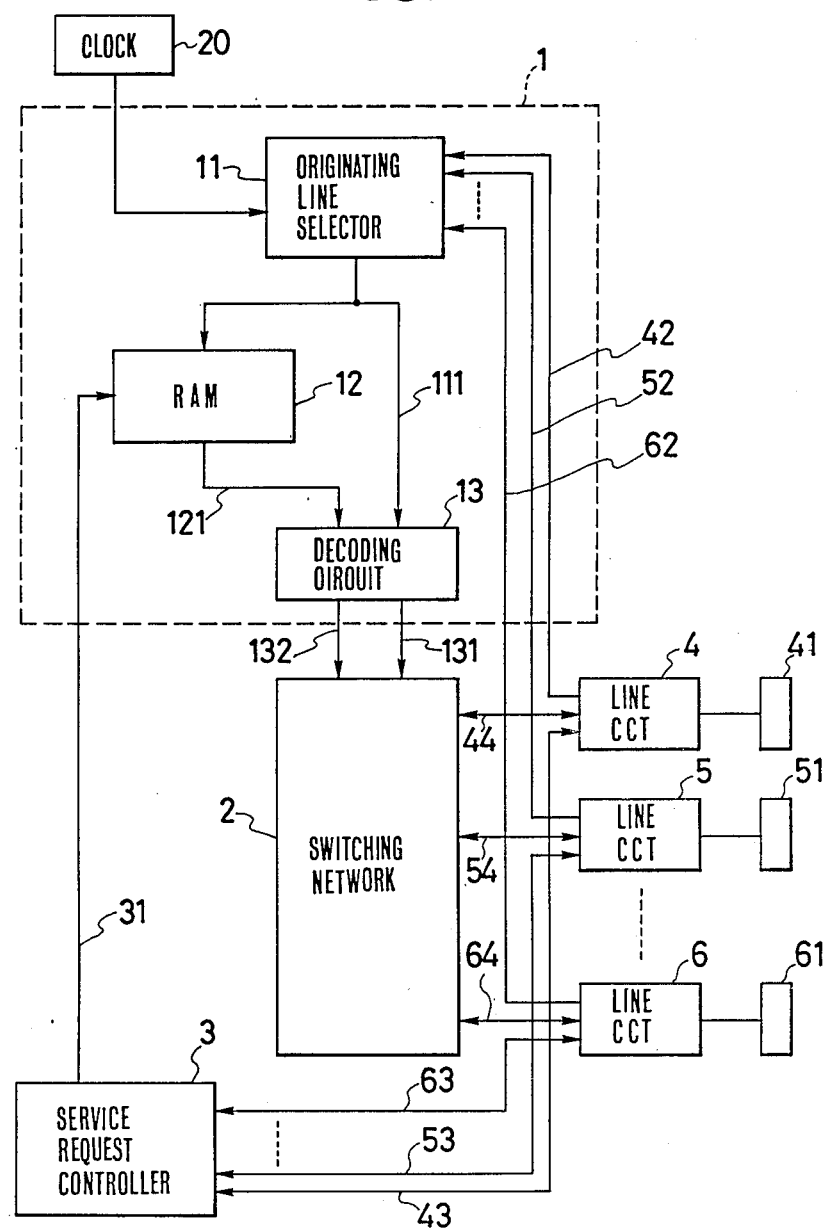
FIG. 1 is a block diagram of a first embodiment of the present invention.

Referring now to FIG. 1, there is shown a time division digital switching system according to a first embodiment of the present invention. In FIG. 1, the switching system generally comprises a network controller 1, a time-division switching network 2, a service request controller 3, and a plurality of line circuits. For purposes of disclosure, only three line circuits 4, 5 and 6 are shown. Line circuits 4, 5 and 6 are connected to the network controller 1 through lines 42, 52, 62, to the service request controller 3 through lines 43, 53, 63 and to the switching network 2 via lines 44, 54 and 64. Terminal stations 41, 51 and 61 having address codes "01", "10" and "11" respectively are connected to the line circuits 4, 5 and 6.

Network controller 1 comprises an originating line selector 11, a random access memory 12 and a decoding circuit 13. Memory 12 stores destination address codes in locations addressable as a function of an originating line address code. Originating line selector 11 receives proceed-to-send requests from line circuits 4, 5, 6 to select one of the requesting line circuits according to priorities of different levels preassigned to the line circuits in a manner as will be described later, and supplies the address code of the selected originating station to the decoding circuit 13 on line 111 and to the memory 12 for reading the desired destination station address code from the memory 12 into the decoding circuit 12 through line 121.

Assuming that a service request is made by the terminal station 51 desiring to set up a communication to the terminal station 61, for example, the line circuit 5 responds by applying a logical 1 on line 53 to the service request controller 3 followed by the destination address "11" and its own address "10". Controller 3 supplies an output signal comprising the originating address code "10" and the destination address code "11" to the memory 12 on line 31, so that the destination code "11" is stored in a location addressable by code "10". When service requests occur simulaneously, controller 3 treats them according to a predetermined sequence and sequentially stores destination addresses into memory 12.

When the originating line circuit 5 receives a data block from terminal station 51, it sends a proceed-to-send request to the originating line selector 11 which in turn supplies the originating station address code "10" to memory 12 and to decoding circuit 13 to which the destination code "11" is also applied from memory 12.

Figure 2:
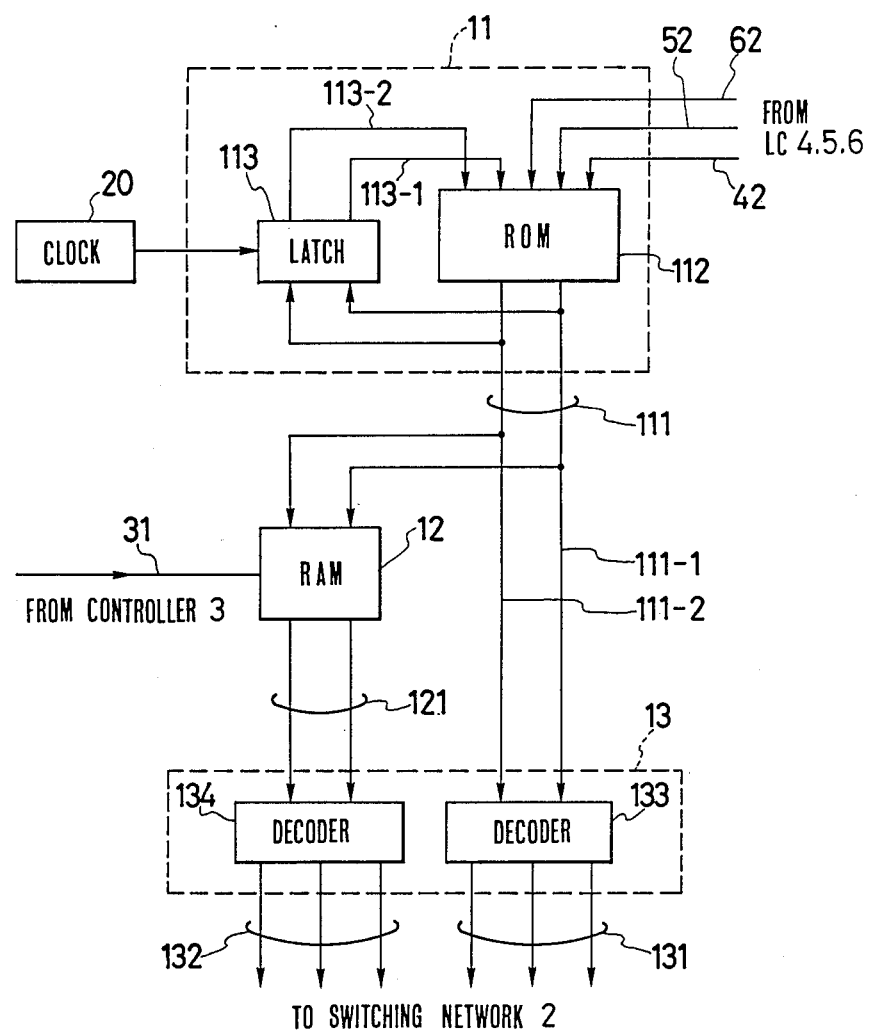
FIGS. 2 and 3 are details of the first embodiment.
Figure 3:
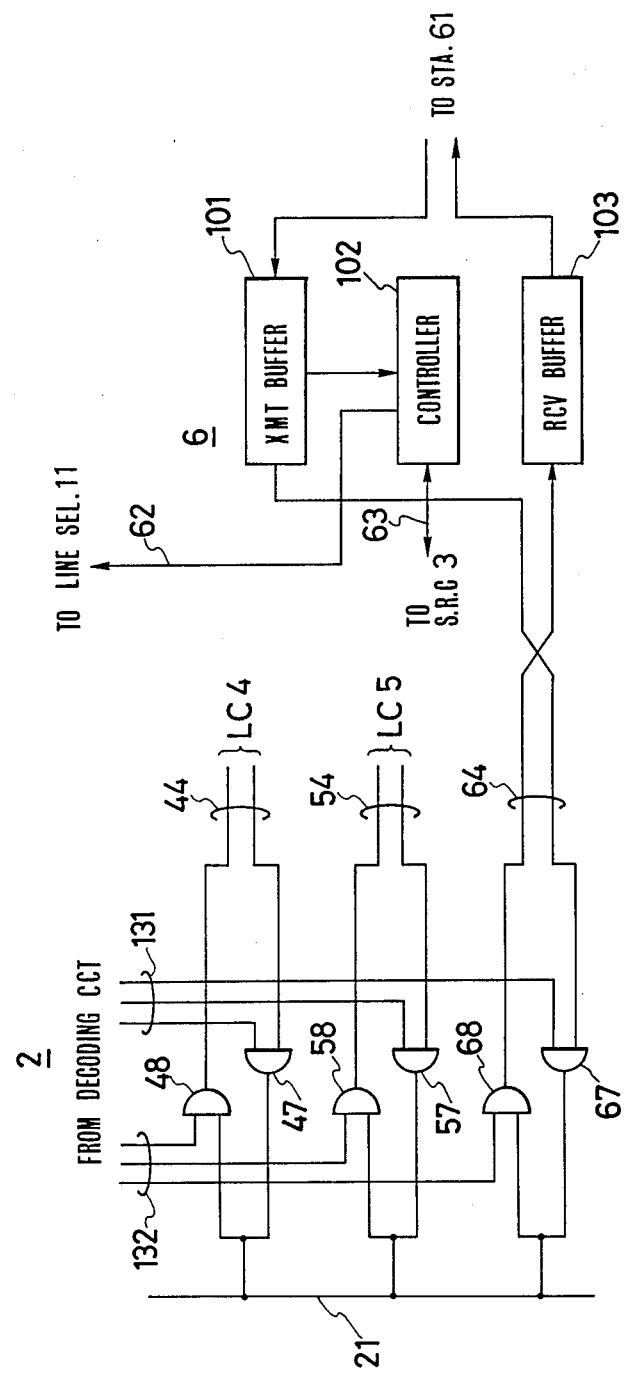

As shown in FIG. 2, the decoding circuit 13 comprises a pair of decoders 133 and 134 which receive the originating and destination address codes, respectively, to selectively enable lines 131 and 132 which are connected to AND gates 47, 57 and 67 and AND gates 48, 58 and 68 of the switching network 2, respectively (FIG. 3). Thus, the address code "10" of the originating line circuit 5 and the address code "11" of the destination line circuit 6 are decoded into logical signals which enable AND gates 57 and 68, establishing a one way path through a common bus, or highway 21 between line circuits 5 and 6. If full duplex communication is desired, the service request controller 3 is instructed to additionally store the originating address code "10" into a memory location addressable by the destination code "11". In that instance, AND gates 57, 58, 67 and 68 will be enabled.

As shown in FIG. 2, the originating line selector 11 comprises a read-only memory (originating line memory) 112 and a latch 113 which is clocked by a source 20. Memory 112 has address inputs connected to the proceed-to-send request lines 42, 52 and 62 and the output lines 113-1 and 113-2 of latch 113 which takes its inputs from the output lines 111-1 and 111-2 of the memory 112 and feeds the outputs of ROM 112 to its inputs with a delay of one clock interval.

Each line circuit is of identical construction. Line circuit 6, for example, comprises a transmit buffer 101 in which a data block received from terminal station 61 is stored. Transmit buffer 101 signals a line controller 102 to cause it to send a service request to the service request controller 3 and a proceed-to-send request to originating line selector 11. Transmit buffer 10 has an output to one input of AND gate 67 of the switching network. A receive buffer 103 has an input to the output of AND gate 68 of the network.

FIG. 5 shows relationships between the binary output states of memory 112 and the address inputs supplied from proceed-to-send request lines 42, 52 and 62 and latch output lines 113-1 and 113-2. A proceed-to-send request is granted with highest priority to line circuit 6 when it competes with any other line circuit as indicated by two asterisks in the 4th row and one asterisk in the 8th and 12th rows and is granted to line circuit 5 when it competes with line circuit 4 as indicated by one asterisk in the 3rd and 15th rows. Each line circuit has a right to continue communication as indicated by two asterisks in the 6th, 11th and 16th rows (in which its own address code is given at the latch output lines 113-1 and 113-2), i.e., the proceed-to-request is not granted to any line circuit when the highway is occupied by any other line circuit. When there is no competition, the request is automatically granted to any line circuit as indicated by the 2nd, 7th, 10th and 14th rows. It is seen that the binary states given in the 2nd to 5th, 7th to 10th, and 12th to 15th rows exist only for one clock interval and the remainder continue as long as there is no proceed-to-send request (1st row) or a communication by another line circuit continues (6th, 11th and 16th rows) as noted above.

Figure 4:
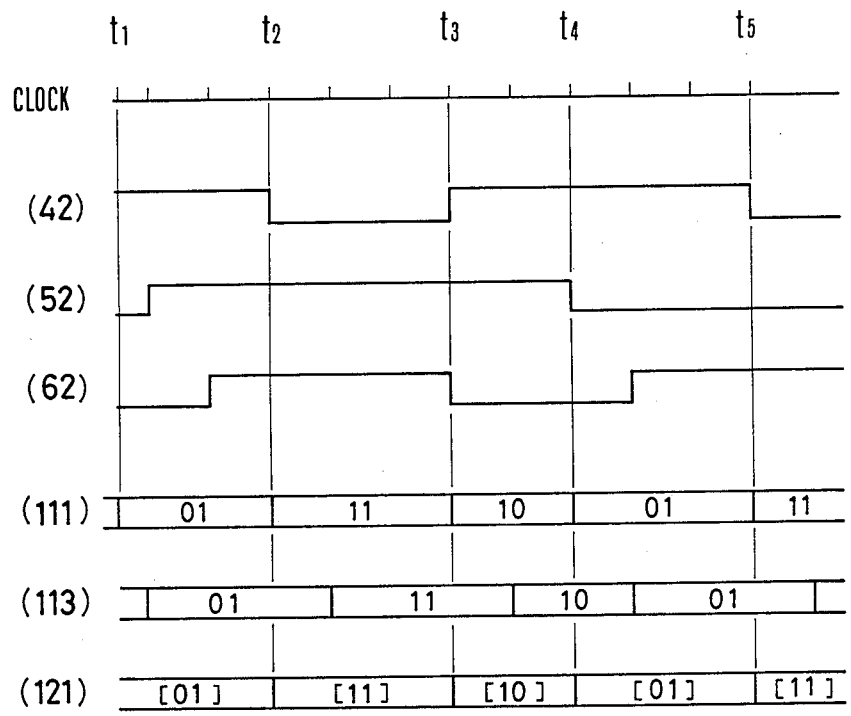
FIG. 4 is a timing diagram useful for describing the operation of the first embodiment.

The operation of originating line selector 11 is described with reference to FIG. 4. Assuming that there is a proceed-to-send request made on line 42 from line circuit 4 at time $t_1$, the ROM outputs change from "00" to "01" which condition prevails until line circuit 4 removes the proceed-to-send request at time $t_2$. At time $t_2$, a proceed-to-send request from line circuit 6 is granted since it is given a higher priority than line circuit 5, causing the ROM outputs to change to "11". The proceed-to-send request made by line circuit 5 is served at time $t_3$ when line circuit 6 removes its request even though 1 request is made again by line circuit 4, with the ROM outputs being changed to "10". Exclusive presence of a request from line circuit 4 during the period $t_3$ and $t_4$ changes the ROM outputs to "01" until it is removed at time $t_5$. The outputs of latch 113 change correspondingly with the outputs of ROM 111 with a delay of one clock interval and likewise the destination address codes, which are given by the associated originating address code within brackets, change accordingly. Therefore, it will be seen that data blocks from each line circuit are broken into variable-length time slots and interleaved on the common highway 21 and thus no vacancy exists on the highway path, so that the traffic handling capacity of the switching system of the invention is increased to its fullest extent.

There is often a need to allow a certain group of line circuits to establish a pathway by interrupting an existing communication between other line circuits. FIG. 6 shows a modified form of the relationships between the output states of memory 112 and its address inputs. A proceed-to-send request is granted with highest priority to line circuit 6 when it competes with any other lines circuits as indicated by two asterisks in the 4th, 8th and 12th or when it is in communication as indicated by two asterisks in the 16th row. The request is granted to line circuit 5 when it competes with line circuit 4 as indicated by one asterisk in the 3rd, 11th and 15th rows, but not granted to it when line circuit 4 is in communication as indicated by one asterisk in the 6th row. When there is no competition, the request is automatically granted to any line circuit as indicated by the 2nd, 7th, 10th and 14th rows in a manner similar to FIG. 5. This embodiment is particularly advantageous for switching systems which must provide real-time services to telephone subscribers and nonreal-time services to data processing terminals. By giving the highest priority to telephone subscribers, the switching system can efficiently integrate services to telephone subscribers with services to data processing terminals. In that instance, the line circuits of telephone subscribers issue a proceed-to-send request at intervals of 125 microseconds for transmission of 8-bit PCM codes. If the traffic load of the highest-priority group exceeds the traffic handling capacity of the switching network 2, the excess calls are rejected by the service request controller 3 by imposing an emergency traffic restriction procedure on that group as employed in prior art systems.

A further modification of the priority control is shown in FIG. 7 in which the highest priority is equally given to all the line circuits so that a proceed-to-send request made by any line circuit is granted at any time, but limited for only one clock interval. Such requests are interleaved with other line circuits, so that the system operates in a constant time-slot mode when more than one proceed-to-send request is made at the same time and operates in a variable-length time-slot mode when there is only one proceed-to-send request. More specifically, a proceed-to-send request is granted with a highest priority to line circuits 5, 6 and 4 respectively for latch output states "01", "10" and "11" respectively, as indicated by two asterisks in the 7th, 12th and 14th rows and granted with a lower priority to line circuits 6, 4 and 5 respectively for the same latch output states as the highest priority is given to the above line circuits, as indicated by one asterisk in the 8th, 10th and 15th rows. If proceed-to-send requests are simultaneously made by line circuits 5 and 6 when line circuit 4 is in communication in which the latch outputs are in the "01" state, the request is granted first to line circuit 5, causing the latch outputs to change to "10". With a delay of one clock interval, the request is granted to line circuit 6 as is seen from the 12th row, causing the latch outputs to change to "11". With the latch output state being switched to "11", the request from line circuit 5 is then granted as seen from the 15th row, causing the latch outputs to change to "10" again. The process is repeated to perform operations given in the 12th and 15th rows.

At the end of the communication, the originating line circuit sends a clear request to the controller 3 to rewrite the stored contents of destination address memory 12.

Figure 8:
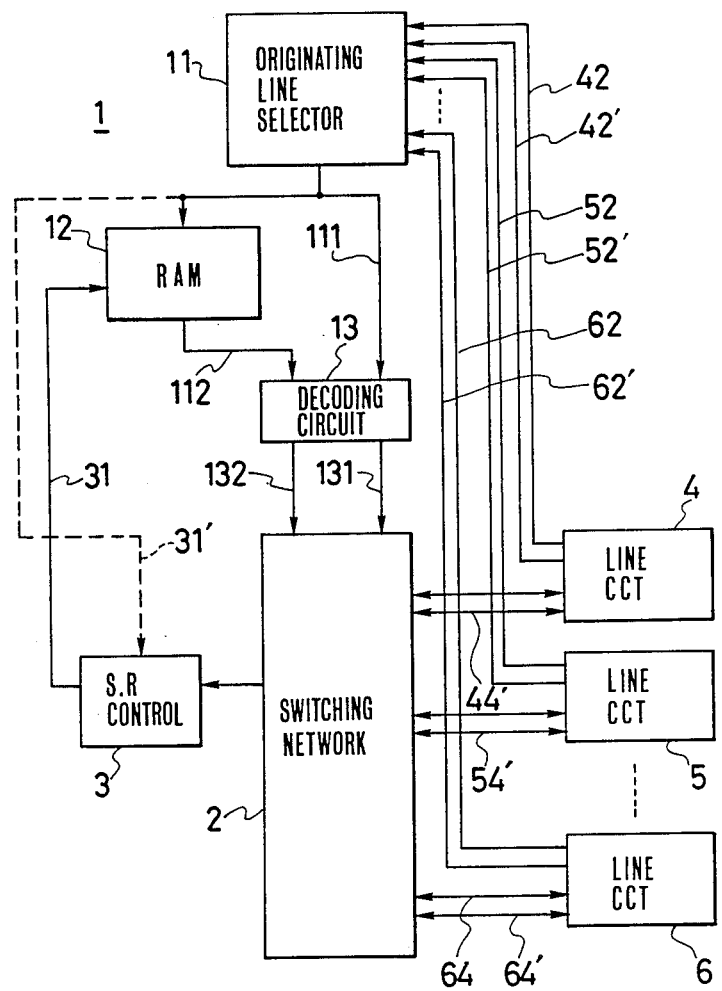
FIG. 8 is a block diagram of a modified form of the first embodiment.

In the embodiment of FIG. 1, the service request is granted by the service request controller 3 bypassing the switching network 2. FIG. 8 is an illustration of a modification of the FIG. 1 embodiment where a requests for service are granted by registering destination address codes through the switching network according to a sequence determined by the originating line selector 11. To this end, the service request controller 3 is connected to a particular terminal of the switching network 2 and assigned an address code signifying that particular terminal. Line circuits 4, 5 and 6 have service request lines 42', 52' and 62' respectively connected to the address inputs or memory 112 of originating line selector 11 and have control lines 44', 54' and 64' respectively connected to the switching network 2. Service requests are placed on lines 42', 52' and 62' and granted by selector 11 with priorities determined by one of the priority schemes described above. The address code of the selected line circuit is delivered from the memory 112 of selector 11 to destination memory 12 in a manner identical to that described previously. Memory 12 distinguishes the input address code supplied to it from selector 11 in response to the request for service from the one given to it in response to a request for proceed to send and generates the address code of the service request controller 3. Decoding circuit 13 directs the switching network 2 to establish a pathway between the service request controller 3 and the granted line circuit. Upon completion of the service-request pathway, the originating line circuit sends a destination address code and its own address to the controller 3, whereupon it proceeds to register the destination code through line 31 into a location of memory 12 addressable by the originating address code. It will not be necessary for the originating line circuit to send its own address code if an arrangement is made to transfer the originating address code from the selector 11 to the service request controller 3 via a broken-line 31'.

In the previous embodiments, each line circuit sends a clear request to the service request controller 3 at the end of each communication to have it rewrite the contents of memory 12 in preparation for the next call. If the originating station is a computer terminal which switches from one user terminal to another in rapid succession, the line circuit of the computer terminal must deposit a clear request and then a new service request each time the connection is switched. This will impose an additional traffic load on the switching network, causing a decrease in throughput.

Figure 9:
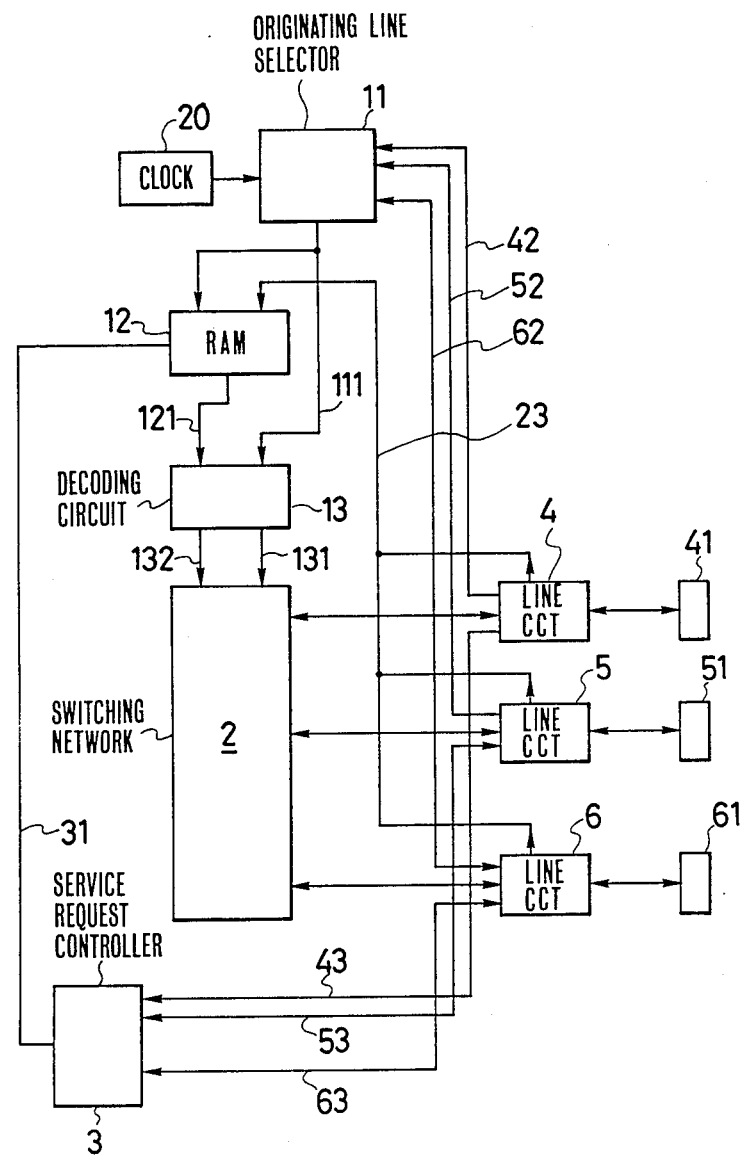
FIG. 9 is a block diagram of a second embodiment of the present invention.
Figure 10:
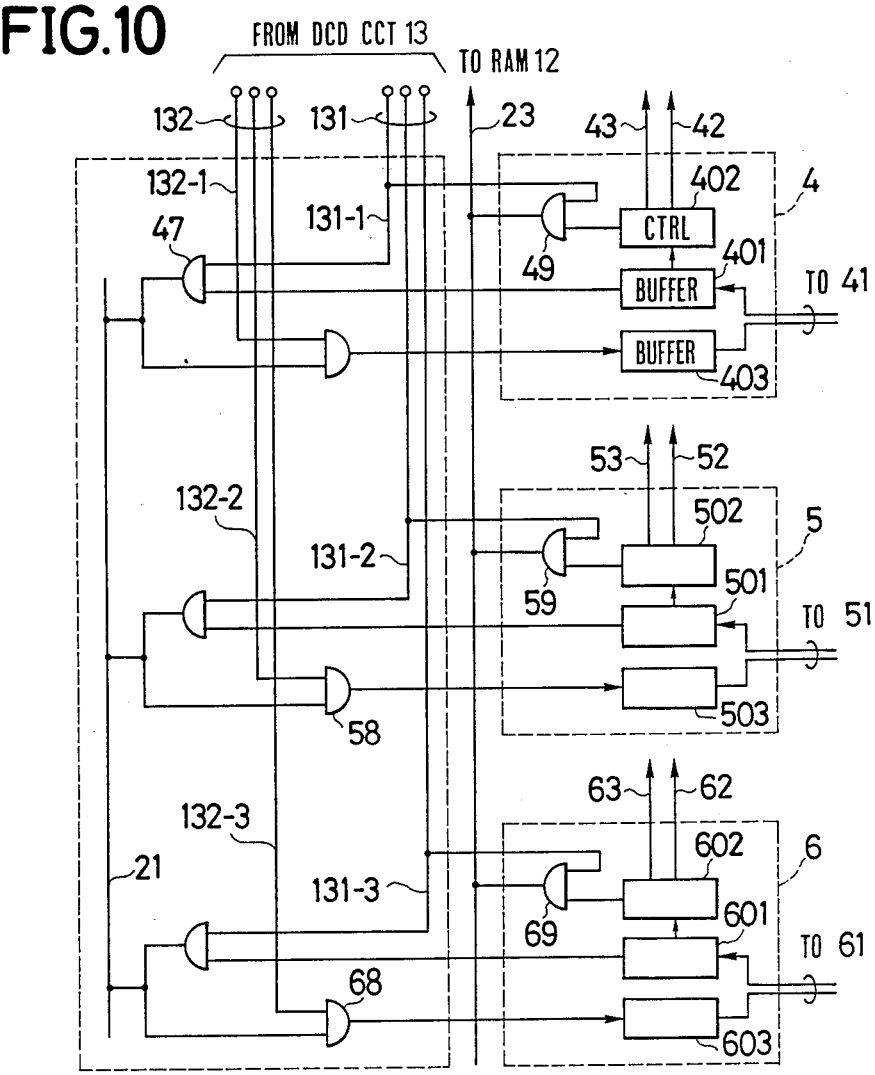
FIG. 10 is an illustration of details of the second embodiment.

A second embodiment of the invention, shown in FIG. 9, permits the switching system to operate efficiently when destinations are switched in rapid succession. This embodiment is similar in structure to the FIG. 1 embodiment with the exception that each line circuit has a control line 23 to an address input of the destination memory 12. Assume that terminal station 41 is a computer terminal desiring to have access in succession to terminal stations 51 and 61 which are assumed to be user terminals. As shown in detail in FIG. 10, line circuit 4 includes an AND gate 49 having a first input terminal connected to the line controller 402 and a second input terminal conneced to line 131-1 of the switching network 2. Likewise, line circuits 5 and 6 have AND gates 59 and 69 whose first inputs are connected to controllers 502 and 602, respectively, and whose second inputs are connected to lines 131-2 and 131-3, respectively. The output terminals of AND gates 49, 59 and 69 are connected to the control line 23.

Figure 11:
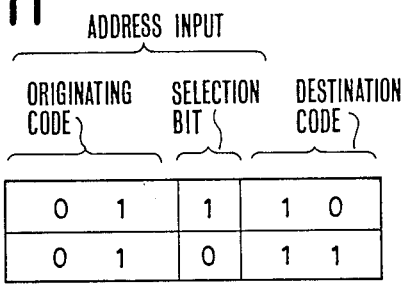
FIG. 11 is an illustration of a data structure stored in the destination address memory of FIG. 9.

Line circuit 4 sends a service request signal on line 43 from the controller 402 to service request controller 3 and also sends to it the address codes "10" and "11" of user terminals 51 and 61, respectively, as well as its own address code "01". Service request controller 3 proceeds to write the destination code "10" into a storage location addressable by the orignating address code "01" plus a binary "1" and to write the destination code "11" into an adjacent location addressable by the code "01" plus a binary "0", as illustrated in FIG. 11. When a data block is received from the computer terminal 41, controller 402 applies a logical "1" to proceed-to-send request line 42 and to AND gate 49. If the request is granted, line selector 11 supplies the originating address code "01" to the memory 12 and to the decoding circuit 13. Decoding circuit 13 applies a logical "1" to line 131-1, enabling AND gate 47 and activating AND gate 49. Logical "1" is applied to control line 23 and combined with the 2-bit originating address code "01" at the address inputs of memory 12 to produce an address input "011", so that the destination code "10" is read out of the memory 12 into the decoding circuit 13. As a result, a logical "1" is applied to line 132-2 from decoding circuit 13, enabling AND gate 58 to complete a pathway between transmit buffer 401 and receive buffer 503.

When the computer terminal desires to switch the pathway to line circuit 6, controller 402 applies a selection bit "0" to AND gate 49 while maintaining the proceed-to-send request line 42 at logical "1". The binary state on line 23 is switched to logical "0" which is combined with the originating address code "01" at the address inputs of memory 12 to produce a 3-bit address input "010" to read the destination code "11" of line circuit 6 therefrom into decoding circuit 16, with the result that a logical "1" is placed on line 132-3 to establish a pathway between transmit buffer 401 and receive buffer 603. Therefore, the computer terminal is capable of switching between user terminals 51 and 61 in rapid succession by changing the binary states of line 23 while continuously making the proceed-to-send request. It will be seen that the computer terminal can successively transmit information to more than two user terminals by making the controller of each line circuit issue a $2^n$-bit switching code which is transmitted on an n-line bus 23 to the memory 12.

Figure 12:
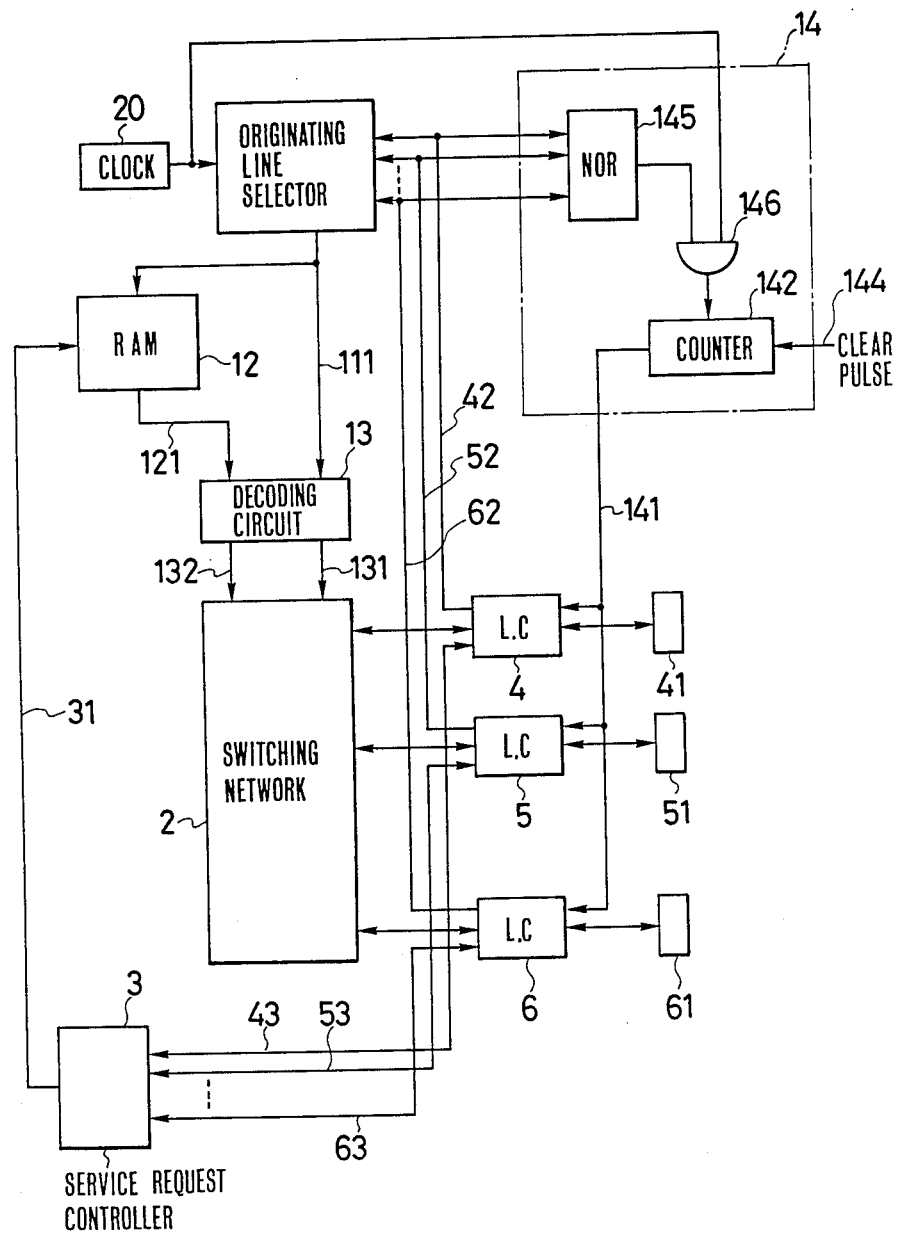
FIG. 12 is a block diagram of a third embodiment of the present invention.
Figure 13:
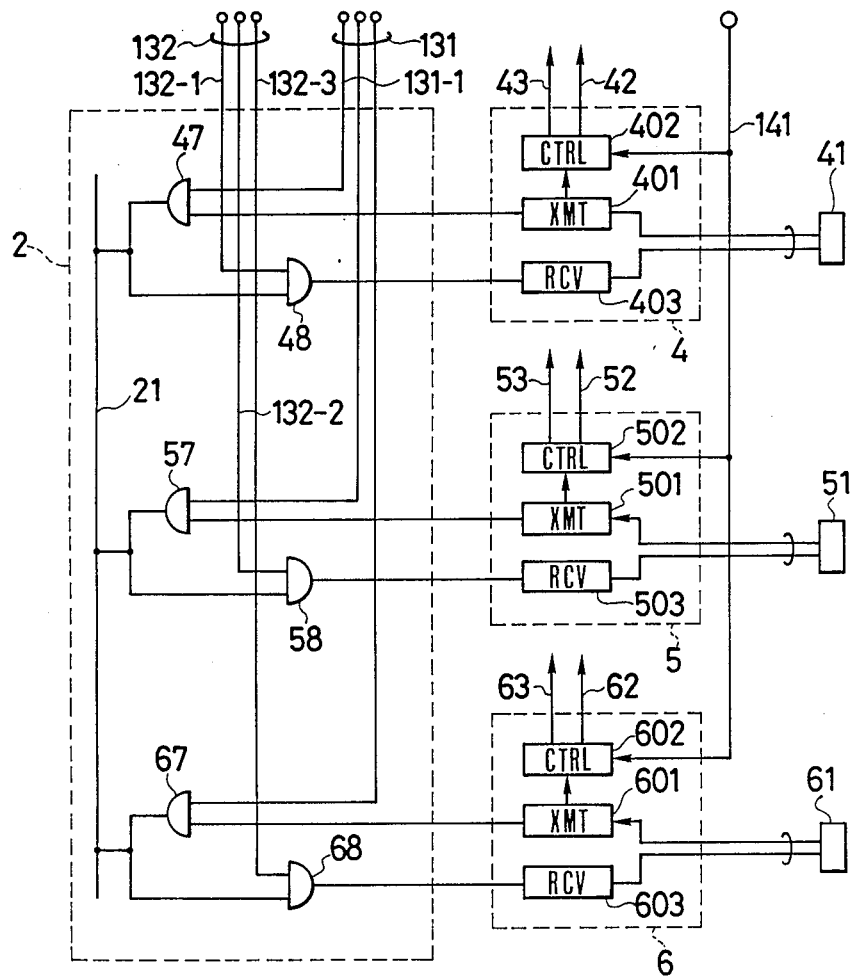
FIG. 13 is an illustration of details of the third embodiment.

FIG. 12 is an illustration of a third embodiment of the present invention which is advantageous for applications in which the terminal stations are capable of sending priority signals indicating the levels of priority given to data blocks which are to be sent from each station to the line. This embodiment is generally similar to the FIG. 1 embodiment with the exception that a priority controller 14 is additionally provided. Priority controller 14 comprises a NOR gate 145 to which the proceed-to-send request lines 42, 52 and 62 are connected, the output of NOR gate 145 being connected to one input of an AND gate 146 to enable it to pass clock pulses from source 20 to a counter 142. Counter 142 is reset in response to a clear pulse supplied on line 144 from an external source to reinitiate counting the output of AND gate 146 for recycle opeations. The NOR gate 145 produces a logical "1" output when there is no proceed-to-send request to enable a clock pulse to be supplied to the counter 142 to increment its count. The count value indicates the level of priority to be given through line 141 to the controller of each line circuit as shown in FIG. 13. The count value 0 indicates the highest priority with the counts increasingly indicating lower levels of priority. Thus, the level of priority supplied to line circuits 4, 5 and 6 decreases successively in response to the occurrence of no proceed-to-request signals. The operation of the third embodiment is as follows. Assume that a service request is made by line circuit 4 desiring to establish a communication to line circuit 6, and the destination code "11" of line circuit 6 is registered into memory 12 with the aid of service request controller 3 in a manner identical to that described with reference to FIG. 1.

When the originating line circuit 4 receives a data block at transmit buffer 401 from the terminal station 41, controller 402 detects the priority of the received data and compares it with the priority supplied on line 141 from priority controller 14. Controller 402 generates a proceed-to-send request on line 42 if the priority of the data is equal to or higher than the priority on line 141. If the request is granted in a manner as described previously, the originating line selector 11 notifies the memory 12 and decoding circuit 13 of the originating station code "01" to establish a communication between line circuits 4 and 6 by enabling AND gates 47 and 68 through lines 131-1 and 132-3, respectively. If there is a subsequent data block in the transmit buffer of another line circuit immediately following the sending of the data block from line circuit 4 to line circuit 6, the priority level of the controller 14 remains unchanged and the subsequent data block is compared with the same level of priority as before. If the subsequent data block has equal or higher priority level, the switching system treats it in the same manner as it has treated the data from line circuit 4 to line circuit 6. However, if there is no data blocks in the line circuits having equal or greater priority levels than the priority level of controller 14, the inputs to NOR gate 145 all switch to low levels, and controller 14 decrements the priority to the next lower level. Thus, the priority level given by controller 14 decreases and data blocks of different line circuits occur in the order of priority level on the highway 21. The process continues until the counter 142 is cleared, resetting the priority to the initial highest level. Real time data such as speech signals can therefore be processed in precedence over non-real time data such as data processing signals.

Figure 14:
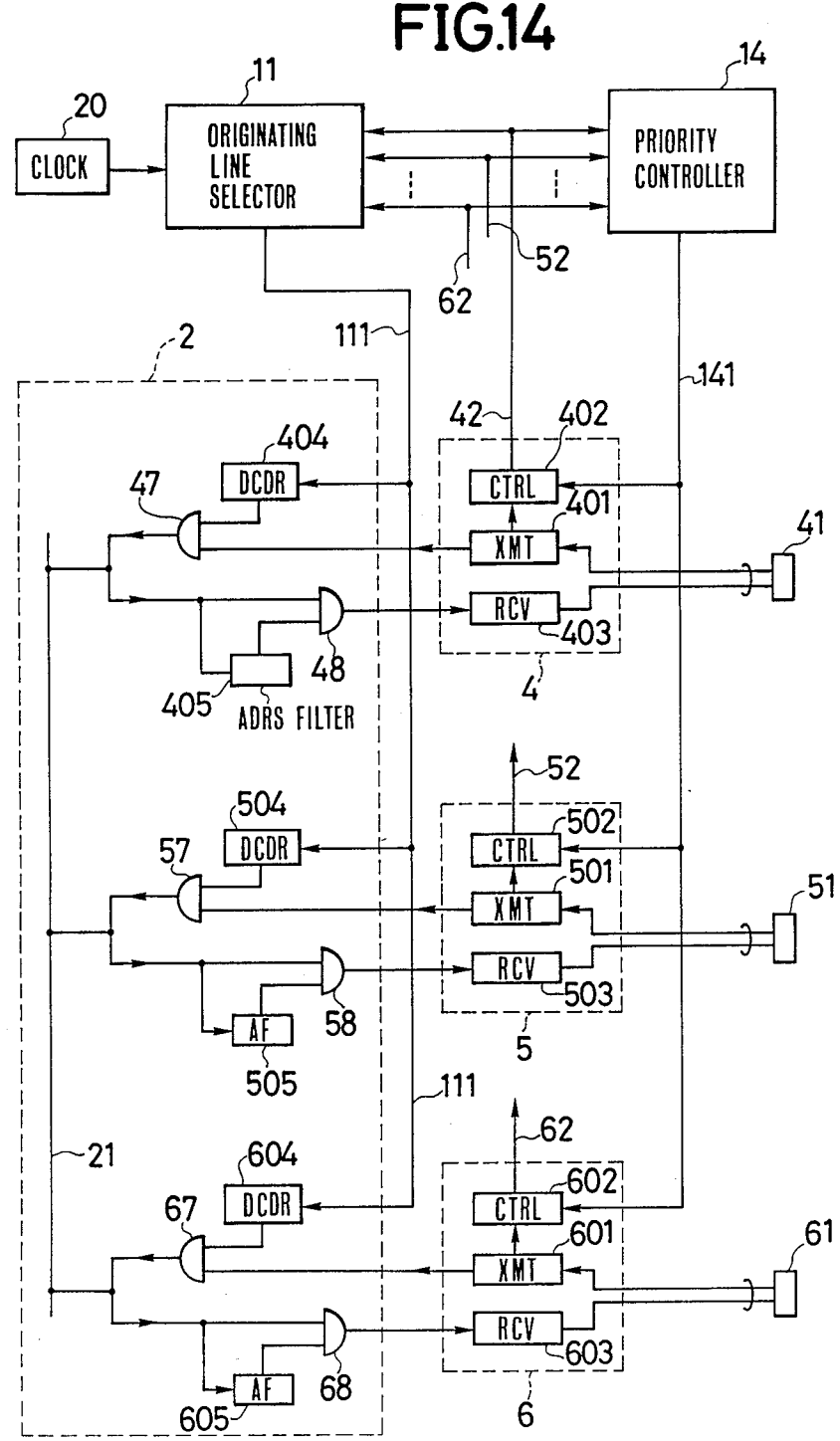
FIG. 14 is a block diagram of a modified form of the third embodiment.
Figure 15:
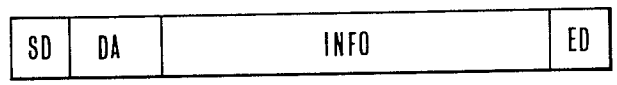
FIG. 15 is an illustration of a data format employed in the embodiment of FIG. 14.
Figure 16:
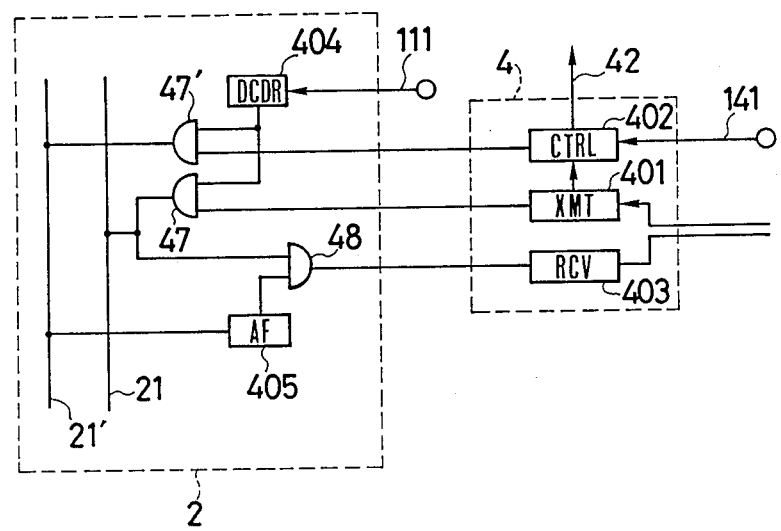
FIG. 16 is a block diagram of a further modification of the third embodiment.

The present invention can also be applied to packet switching systems of FIG. 14 using data blocks each comprising a start delimiter SD, destination address DA, information data INFO and end delimiter ED as shown in FIG. 15. This embodiment is similar to the FIG. 12 embodiment with the exception that the switching network 12 comprises decoders 404, 504, 604 associated respectively with the line circuits 4, 5 and 6 and address filters 405, 505, 605 also associated with these line circuits, and in that service request controller 3 and destination memory 12 are dispensed with. Originating line selector 11 transmits the address code of the granted line circuit to the decoders of the switching network 2. Each decoder of the switching network generates an output when the received originating address code coincides with the address code of the associated line circuit. If the proceed-to-send request is granted to line circuit 4, the decoder 404 will produce an output which enables the AND gate 47 to pass the data block sent from transmit buffer 401 through the highway 21 to all the address filters of the network. If the destination is to line circuit 5, address filter 505 will detect the address code of line circuit 5 in the destination address DA of the data block and enables the AND gate 58 to pass the information data to receive buffer 503 of the line circuit 5. Switching network 2 may comprise an additional common highway 21', as shown in FIG. 16, for transmitting address information, while the highway 21 is used exclusively for transmission of information data. When the decoder 404 detects the address code of the line circuit 4, the address data of the destination from controller 402 is passed through AND gate 47' to the address highway 21' and the information data from transmit buffer 401 is passed through AND gate 47 to the information highway 21. The address information is received by address filter 405 which enables the AND gate 48 when the address coincides with the destination to pass the information on highway 21 to the receive buffer 403.

Figure 17:
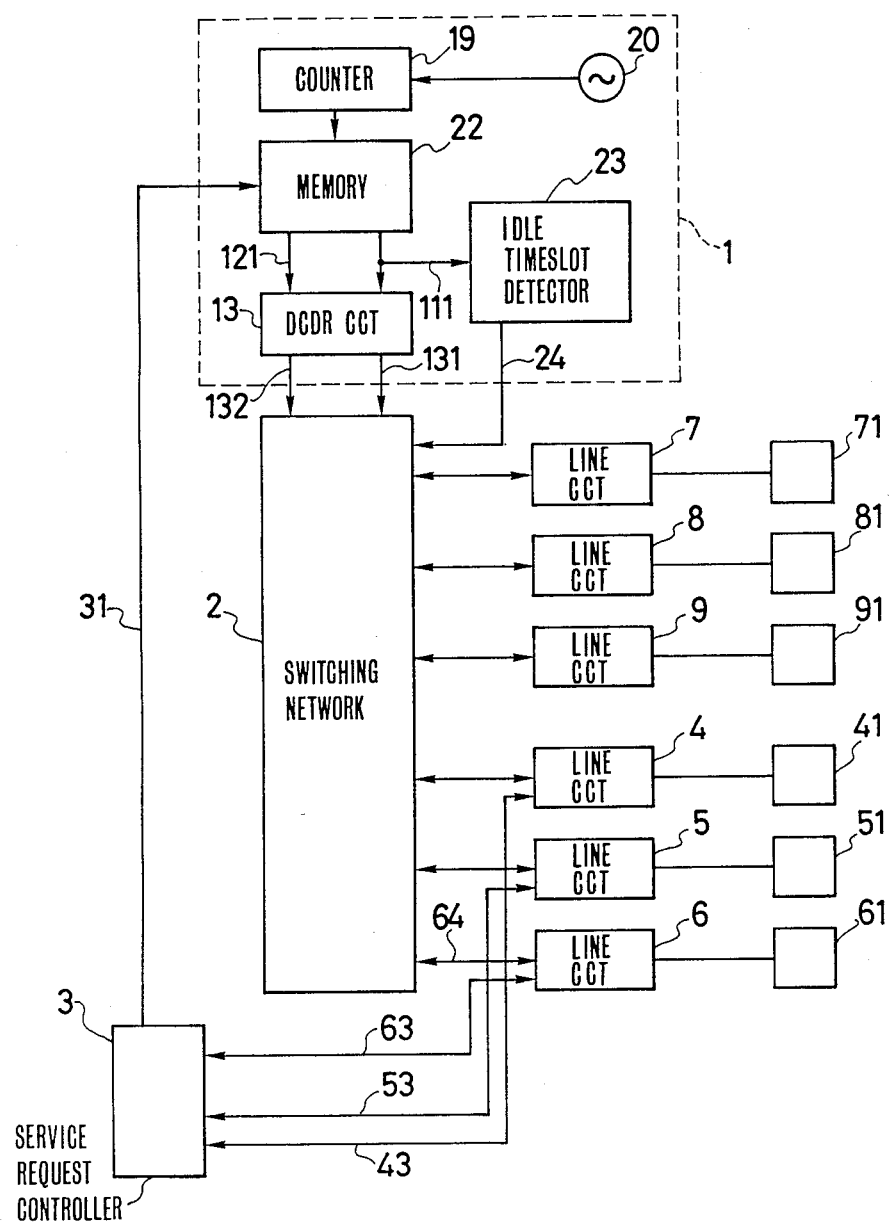
FIG. 17 is a block diagram of a fourth embodiment of the present invention.
Figure 18:
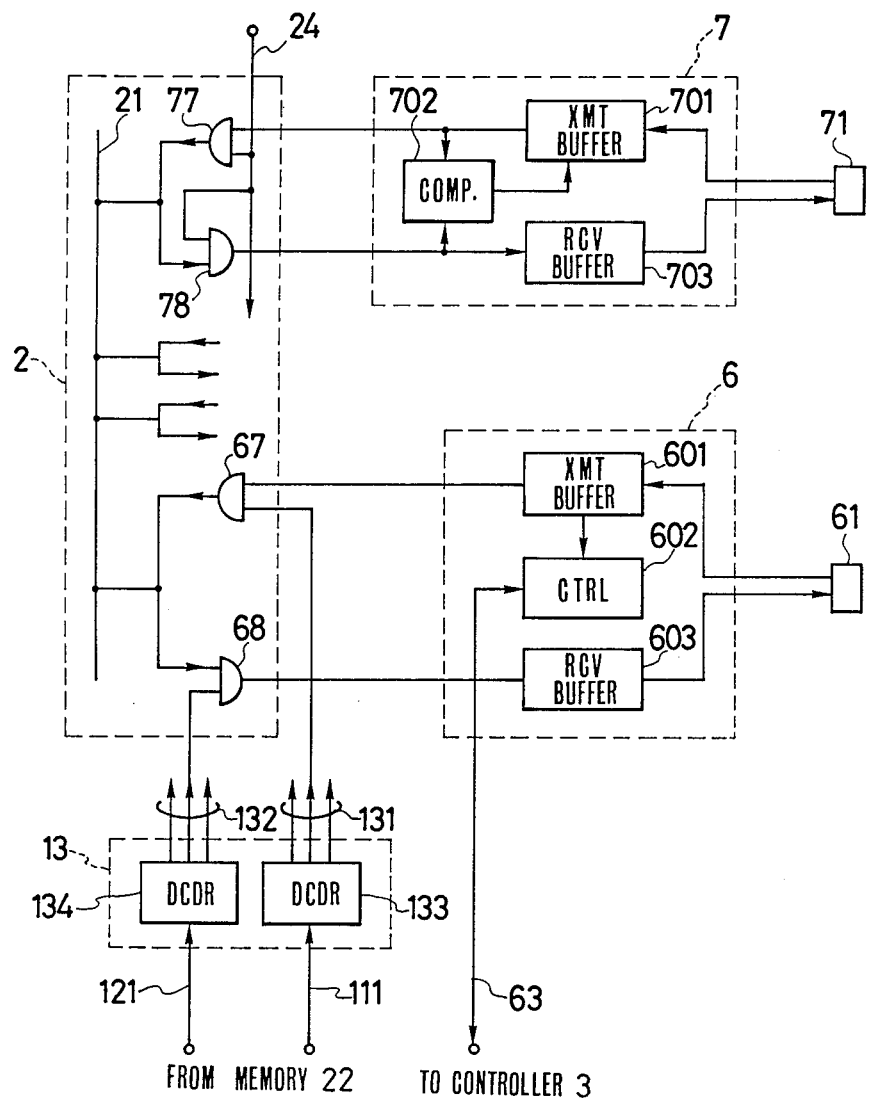
FIG. 18 is an illustration of details of the fourth embodiment.

The traffic handling capacity of the switching system can also be increased by detecting idle time slots and assigning multiple access data to the detected idle time slots. A fourth embodiment of the invention is shown in FIGS. 17 and 18 to accomplish this object. The switching system of this embodiment differs from the embodiment of FIG. 1 in that the switching controller 1 comprises a counter 19 clocked by source 20 and a memory 22 for storing the address codes of originating and destination line circuits in response to a service request deposited on the service request controller 3 by line circuits 4, 5 and 6. Counter 19 sequentially generates memory address signals for reading the stored address codes from the memory 22 into decoding circuit 16 in response to the clock pulse for establishing a communication among the line circuits 4, 5 and 6. The originating line address read out of memory 22 is also applied to an idle time slot detector 23 which monitors the output line 111 of memory 22 to detect idle time slots which are not filled with originating address codes of the line circuits 4, 5 and 6 and supplies an output signal on line 24 to the switching network 2.

To the switching network 2 are connected multiple access line circuits 7, 8 and 9 to which multiple-access terminal stations 71, 81 and 91 are respectively connected. To serve the multiple-access line circuits, the switching network 2 includes plural sets of transmit and receive AND gates, only two of which are illustrated for simplicity, i.e., AND gates 77 and 78 associated with the multiple-access line circuit 7, as shown in FIG. 18. The output line 24 of the idle time slot detector 23 is connected to first inputs of AND gates 77 and 78. The transmit AND gates of the switching network associated with all the line circuits 4 to 9 are of the tristate or open-collector type.

The operation of the fourth embodiment is as follows. Assume that the line circuits 4, 5, 6, 7, 8 and 9 are assigned address codes "001", "010", "011", "101", "110" and "111", respectively. Service request controller 3 constantly monitors the service request lines 43, 53 and 63 and writes "000" into the storage cells of memory 22 in the absence of service requests from line circuits 4, 5 and 6. In response to a service request from line circuits 4, 5 and 6, controller 3 receives a destination address code from the originating line circuit and writes it into the memory together with the address code of the originating line circuit. The stored data is read from memory 22 at clock intervals and address codes of originating and destination line circuits are respectively decoded by decoders 133 and 134. Upon detection of an originating address code, decoder 133 applies a logical "1" to one of its output lines 131 to enable the AND gate of the switching network 2 associated with the originating line circuit and upon detection of a destination address code decoder 134 applies a logical "1" to one of its output lines 132 to enable the AND gate of the switching network associated with the destination line circuit. Since the memory 22 generates its outputs in response to the clock pulse, the logical states of the outputs of decoders 133 and 134 are switched at clock intervals and therefore the information data of different line circuits are carried by constant-duration time slots defined by the clock intervals. Specifically, decoder 133 assigns a transmit time slot by enabling AND gate 67, for example, to allow transmission of data from transmit buffer 601 to the highway 21 and decoder 134 assigns a receive time slot by enabling AND gate 68, for example, to permit reception of data from the highway 21 by receive buffer 603.

Figure 19:
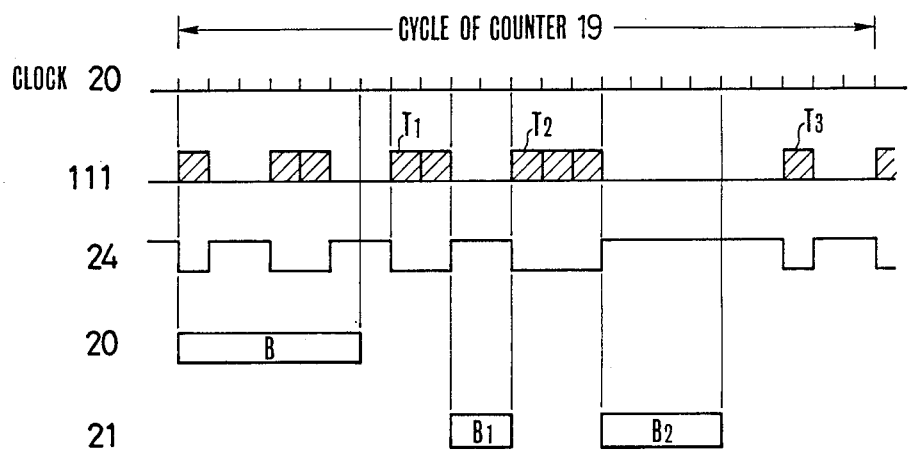
FIG. 19 is a timing diagram associated with the fourth embodiment.
Figure 20:
FIG. 20 is an illustration of a data format employed in the fourth embodiment.

If there is an idle time slot, an idle indicating code "000" is interleaved with the address codes "001", "010", "011" on the output line 111 and is detected by detector 23, which applies a logical "1" on the output line 24. On the other hand, decoders 133 and 134 provide logical "0" outputs in response to the "000" code, and no time slots are thus assigned to the line circuits 4, 5 and 6. The logical "1" on line 24 enables all the AND gates of the switching network 2 which are associated with the multiple-access line circuits 7, 8 and 9 to establish a path from transmit buffer 701 of the line circuit 7 through AND gate 77, for example, to the highway 21 and thence to the receive buffers of all the multiple-access line circuits. Thus, the receive buffers of all the multiple-access line circuits are rendered active during the vacant time slots. A data block stored in the transmit buffer of the originating multiple-access line circuit is sent through AND gate 77 to all the receive buffers of the multiple-access line circuits. Since there is a likelihood of the simultaneous occurrence of a service request from another multiple-access line circuit, a comparator 702 is provided in each multiple-access line circuit. This comparator compares the transmitted data block with a data block received by the receive buffer 703 to determine if they match with each other. More specifically, the data block is in the format of FIG. 20 which includes frame check sequence FCS immediately following the information data field INFO. Comparator 702 compares the transmitted frame check sequence with the received frame check sequence. If the transmitted data block is destroyed by collision with another data block, the received frame check sequence does not match with the transmitted frame check sequence and comparator 702 signals the transmit buffer 701 to retransmit the same data block. If a match occurs between the compared frame check sequences, comparator 702 directs the buffer 701 to proceed to send the next data block and directs the receive buffer to decode the destination address DA of the received data block. If address, DA coincides with the local address, receive buffer 703 transmits the data to its terminal station. Alternatively, receive buffers may be provided with a decoding function for checking the frame check sequence by comparing it with a reference code to detect errors. In this instance, comparator 702 can be dispensed with. Therefore, if a data block 3 having a 6-time-slot length is transmitted from a multiple-access line circuit, it is broken into data segments $B_1$ and $B_2$ as shown in FIG. 19 and transmitted over the highway 21 on time slots which are left vacant between assigned time slots $T_1$, $T_2$ and $T_3$. Since the receive buffers of the multiple-access line circuits are active during idle time slots, the received blocks $B_1$ and $B_2$ form a continuous data block in the receive buffers.

It is seen that line circuits of the individual access group are given a higher priority to occupy time slots than the priority given to the line circuits of the multiple-access group. Thus, efficient use of the switching network is achieved by carrying the data blocks of multiple-access line circuits on variable-length time slots interleaved with the time slots carrying the data blocks of individual-access line circuits.

Figure 21:
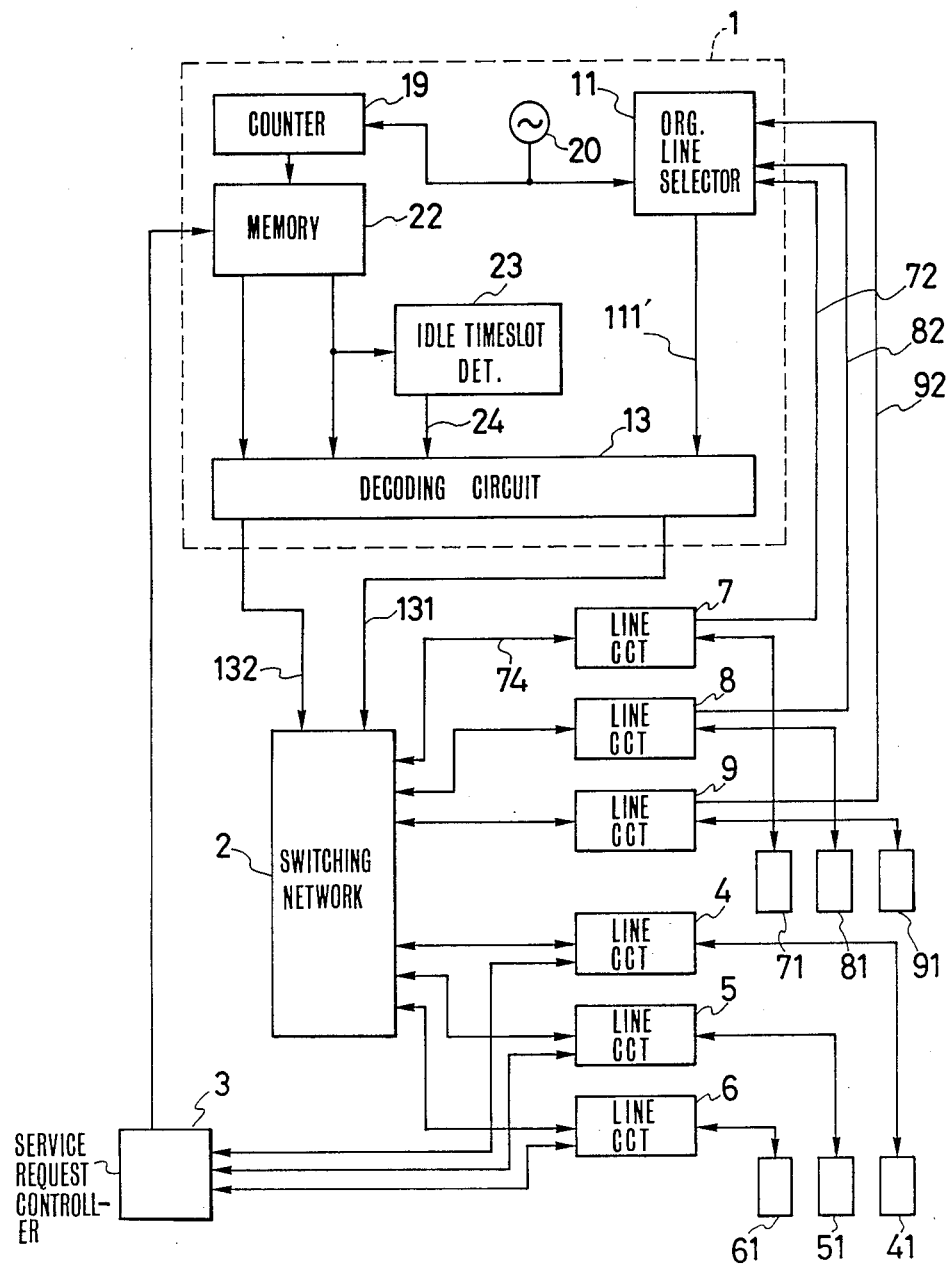
FIG. 21 is a block diagram of a modified form of the fourth embodiment.
Figure 22:
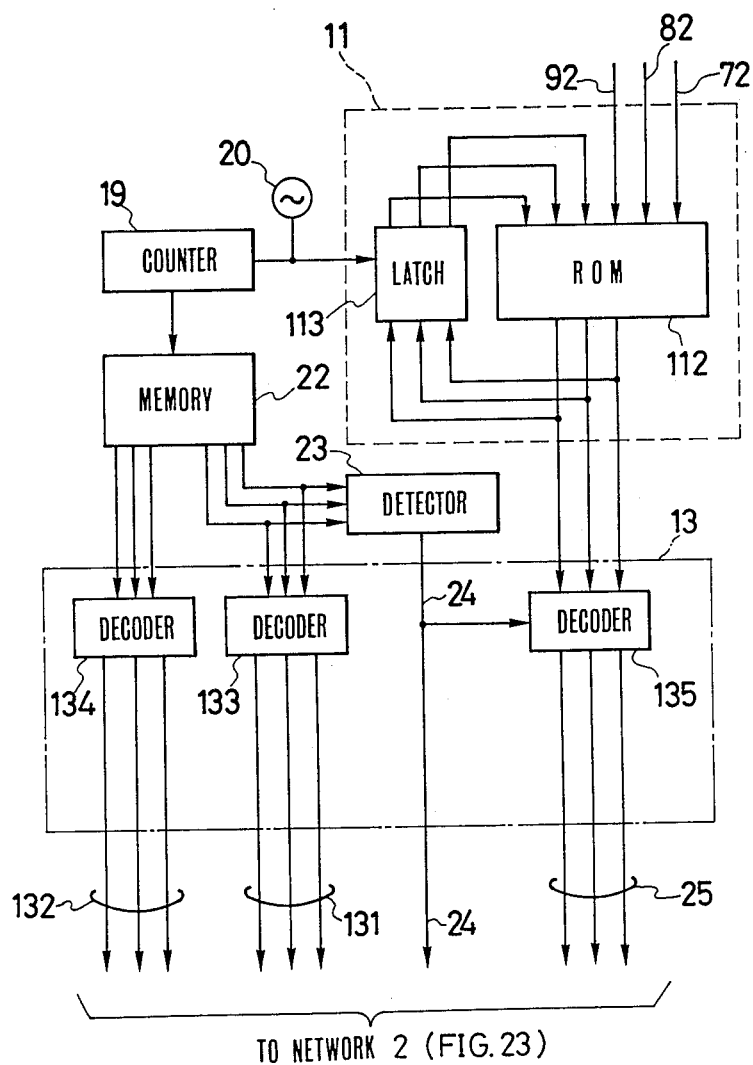
FIGS. 22 and 23 are illustrations of details of the modification of FIG. 21.
Figure 23:
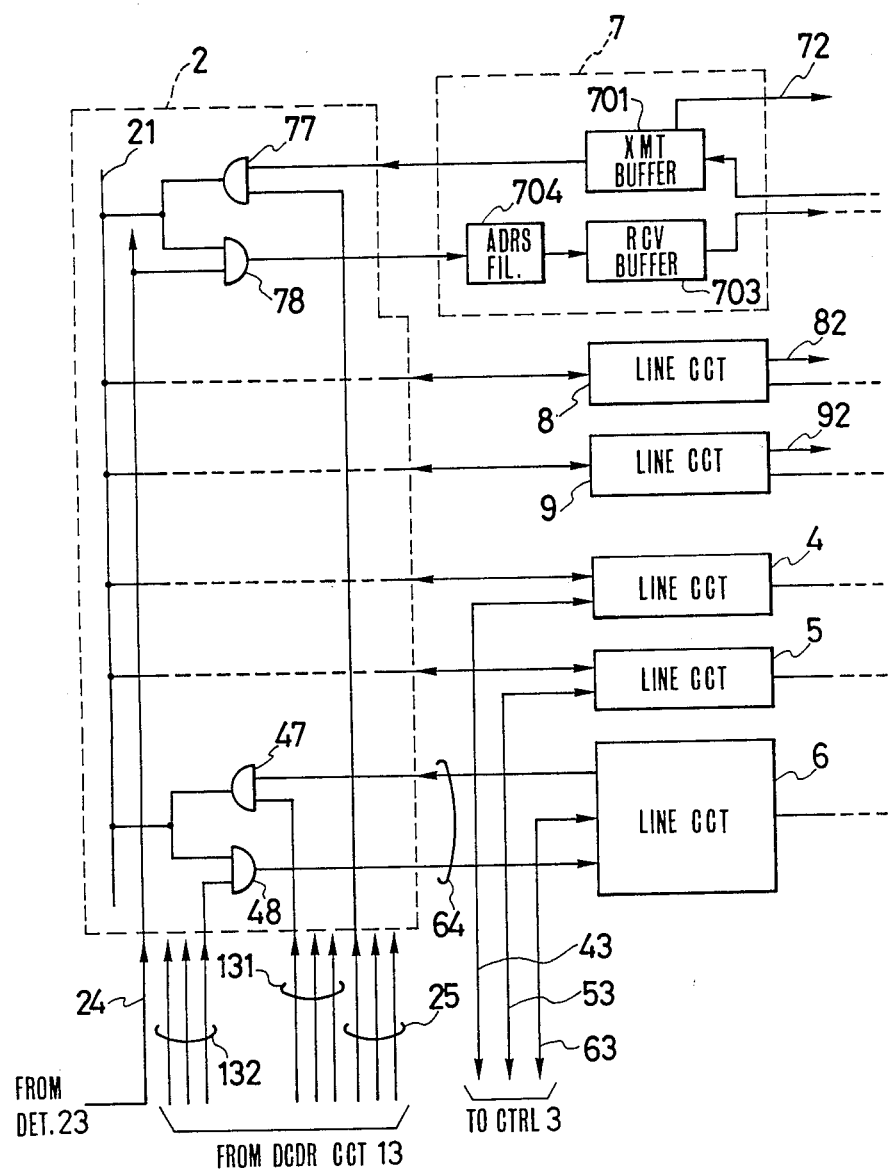

In the embodiment of FIG. 17, the likelihood of collision between multiple-access line circuits increases with a decrease in the available time slots, with a resultant decrease in throughput. This can be avoided by the inclusion of the originating line selector 11 mentioned previously as shown in FIG. 21. Originating line selector 11 receives proceed-to-send requests on lines 72, 82 and 92 from the multiple-access line circuits 7, 8 and 9 and selects one of the requesting line circuits in a manner identical to that described with reference to FIG. 1 and supplies the address code of the granted line circuit to decoding circuit 13. As shown in FIGS. 22 and 23, decoding circuit 13 further includes a decoder 135 which is enabled by a logical "1" on the output line 24 of idle time slot detector 23 to decode the address code of the selected originating multiple-access line circuit supplied from the ROM 112 of selector 11. Output line 24 is connected to the receive AND gates of the network associated with all the multiple-access line circuits as in the FIG. 17 embodiment and outputs 25 of decoder 135 are respectively coupled to the transmit AND gates of the network associated with all the multiple-access line circuits. Thus, the transmit AND gate associated with the granted multiple-access line circuit can be enabled during an idle time slot.

As shown in FIG. 23, each of the multiple-access line circuits includes an address filter 704 connected between the receive AND gate 78 of the network 2 and receive buffer 703. Transmit buffer 701 applies a logical "1" on the proceed-to-send request line 72 in response to receipt of a data block from the terminal station. If the request is granted by line selector 11, transmit AND gate 77 is enabled by decoder 135 during an idle time slot detected by detector 23. At the same time, a logical "1" on output line 24 enables all the receive AND gates of the multiple-access group, allowing transmit buffer 701 to transmit the stored data block therein to AND gate 77 to all the address filters. Each address filter determines if the received code matches its own address code and if so it proceeds to send the received data block to the associated terminal station. Since there is no possibility of data collision, it is not neccesary to provide the data block with a frame check sequence (FCS).

Figure 24:
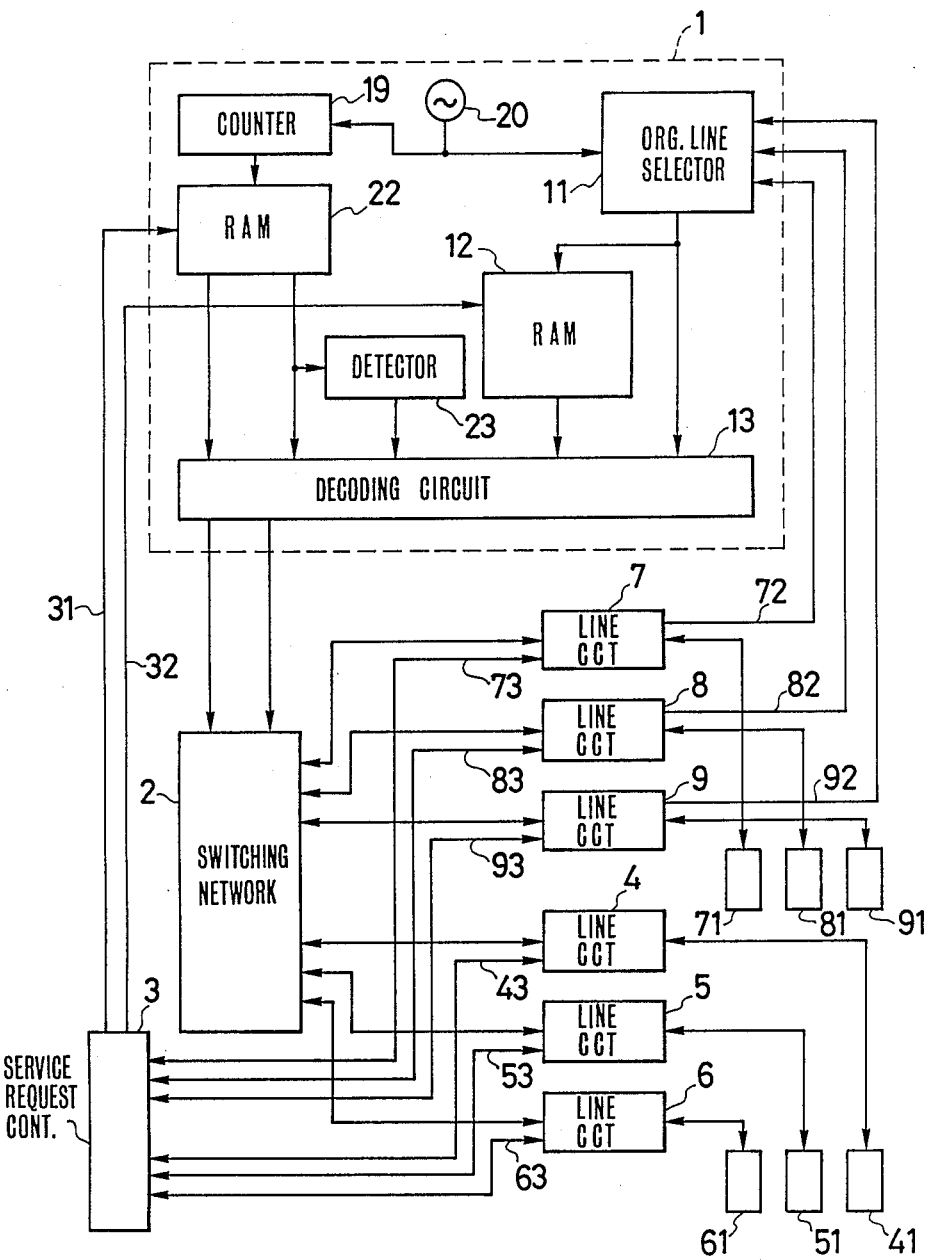
FIG. 24 is a block diagram of a further modification of the fourth embodiment.
Figure 25:
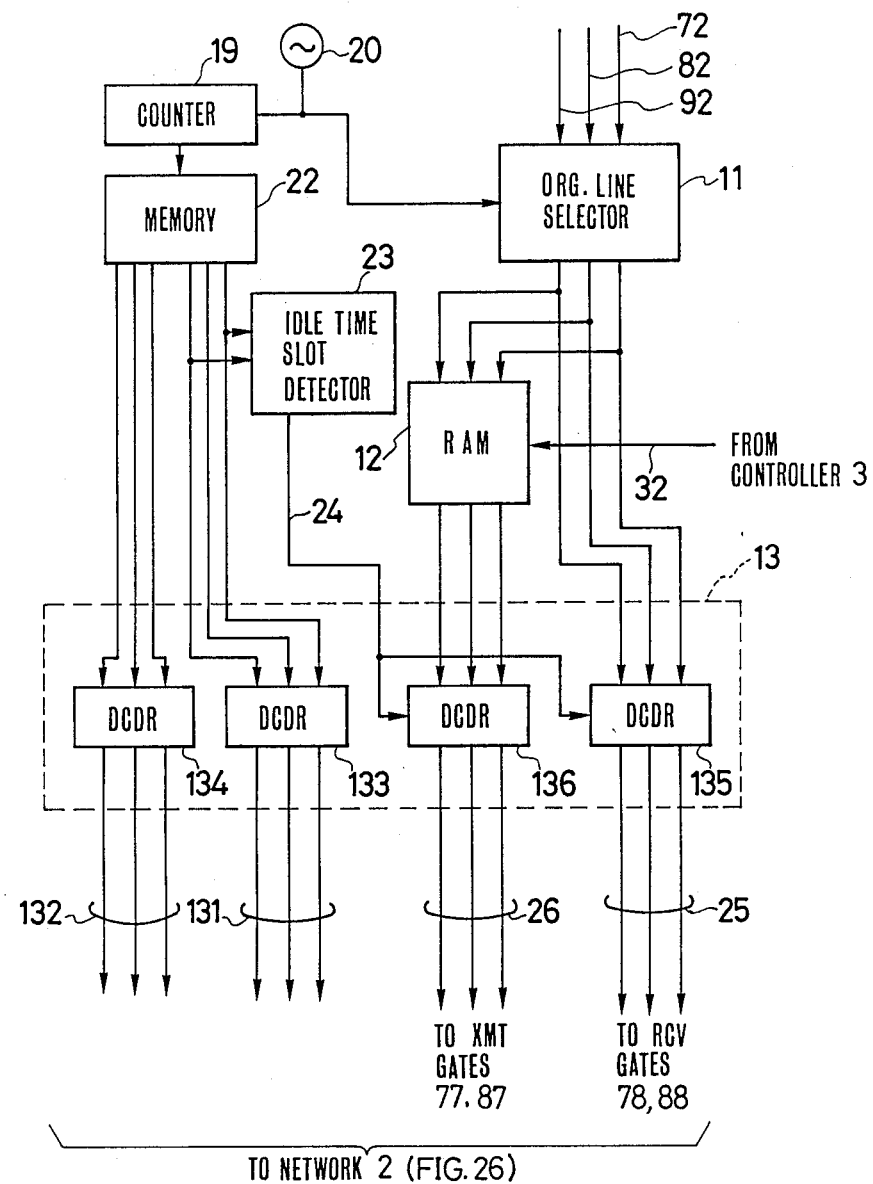
FIGS. 25 and 26 are illustrations of details of the modification of FIG. 24.
Figure 26:
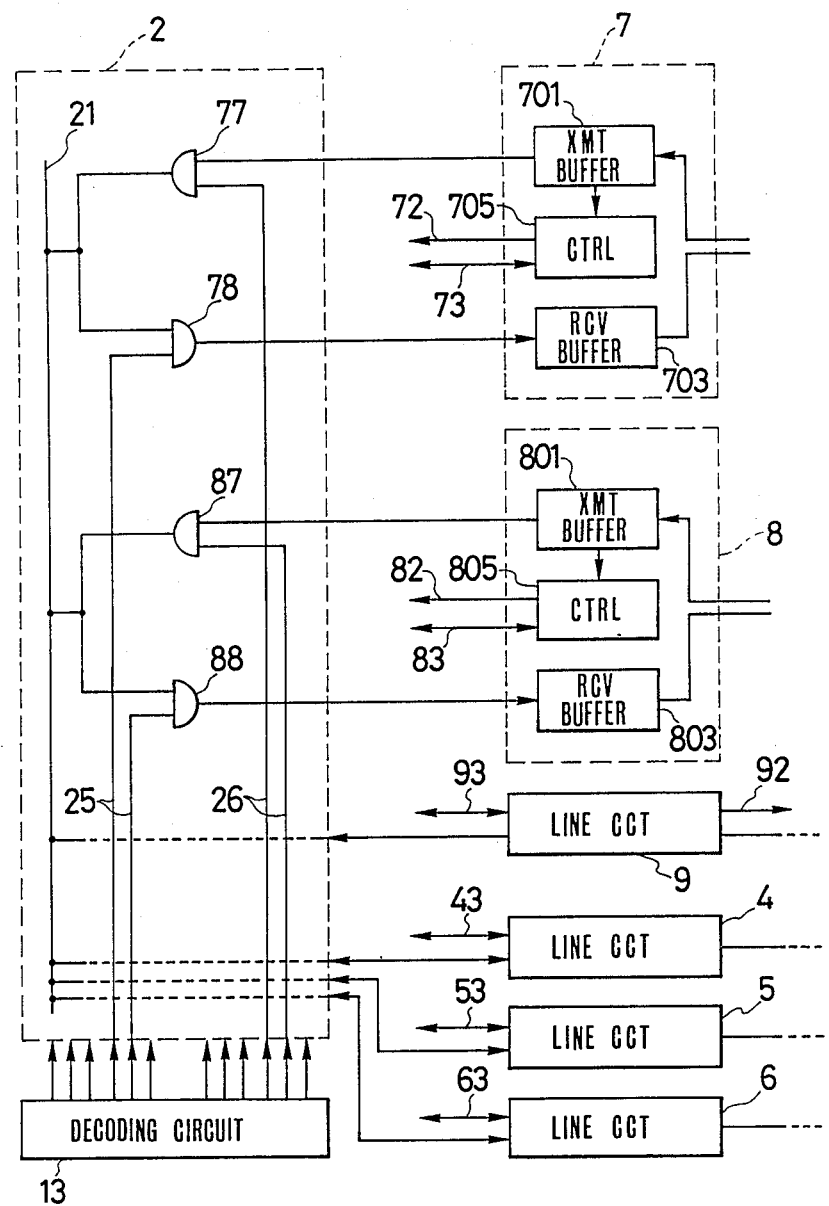

A further modification of the embodiment of FIG. 17 is shown in FIG. 24. In this modification, switching controller 1 includes the destination memory 12, and each multiple-access line circuit includes a controller exemplified at 705 in FIG. 26 to apply a service request on line 73 to the service request controller 3. Controller 3 proceeds to send the originating address code as well as the destination code to memory 12 on line 32 to store the destiation code in a location addressable by the address code of the originating multiple-access line circuit. Whereas, service requests made by the individual-access line circuits cause controller 3 to write address codes of originating and destination line circuits through line 31 into a sequentially addressable location of memory 22 as in the embodiment of FIG. 17. Controller 705 applies a proceed-to-send request on line 72 to the selector 11 upon receipt of a data block from station 71. The output of selector 11 is representative of the address code of the granted multiple-access line circuit, which reads the destination address code out of the memory 12 into a decoder 136 (FIG. 25) provided in the decoding circuit 13. Decoders 135 and 136 are enabled in response to the logical "1" output of idle time slot detector 23 to respectively decode the outputs of selector 11 and RAM 12. The outputs of decoder 135 are applied on lines 25 to the receive gates 78 and 88 of the network and the outputs of decoder 136 are applied on lines 26 to the transmit gates 77 and 87. It will be seen therefore that in this modified embodiment, the data block sent from a multiple-access line circuit is switched through selectively enabled transmit and receive gates to a desired multiple-access line circuit during an idle time slot, rather than to all the multiple-access line circuits.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A time division switching system, comprising:
    a plurality of line circuits respectively associated with terminal stations, each of said line circuits being made capable of generating a service request, a destination address, in response to a request for communication from the associated terminal station, and a proceed-to-send request which continuously persists in the presence of a variable length data block received from the associated terminal station, each of said line circuits being identified by a unique address;
    a read/write memory;
    control means responsive to said service request for storing a destination address in said memory, for granting permission to one of a plurality of said proceed-to-send requests according to priorities assigned to said line circuits, for recalling the destination address from said memory as a function of the address of a source line circuit to which permission has been granted, and for generating a path selection signal in response to the address of said source line signal in response to the address of said source line circuit and the recalled destination address;
    a common bus; and
    path establishing means responsive to said path selection signal for establishing a path between said source line circuit and a destination line circuit through said common bus.

2. A time division switching system as claimed in claim 1, wherein said control means comprises:

a source address memory for storing the addresses of said line circuits, said source address memory having first and second groups of input terminals, said first group of input terminals being respectively connected to said line circuits, each of said line circuits providing one of two logic states to the associated input terminal of said memory as a representation of one of the presence and absence of said proceed-to-send request; and latch means having input terminals respectively connected to output terminals of said source address memory for latching one of said stored addresses recalled from said source address memory, output terminals of said latch means being respectively connected to the second group of input terminals of said source address memory, said source address memory being responsive to a sum of a digital values given by logic states of said second group of input terminals and a digital value given by logic states of said first group of input terminals for recalling an address therefrom.

3. A time division switching system as claimed in claim 1, wherein said line circuits are assigned equal priorities and said control means grants permission to a proceed-to-send request generated by any of said line circuits without interrupting any existing path established by said path establishing means.

4. A time division switching system as claimed in claim 1, wherein said line circuits are assigned equal priorities and said control means grants permission to a proceed-to-send request generated by any of said line circuits for a predetermined fixed time duration by interrupting existing paths established by said path establishing means.

5. A time division switching systems as claimed in claim 1, wherein said line circuits are assigned different priorities and said control means grants permission to a proceed-to-send request generated by a line circuit assigned higher priority by interrupting an existing path established to another line circuit assigned lower priority by said path establishing means.

6. A time division switching system as claimed in claim 1, wherein certain of said line circuits comprise means for generating a switching signal, and wherein said control means includes:

memory means for storing the destination addresses of two or more of said line circuits in response to a service request generated by one of said certain line circuits; and means for selectively recalling destination addresses from said memory means in response to said switching signal in the presence of a proceed-to-send request generated by said one of said certain line circuits.

7. A time division switching system as claimed in claim 1, wherein said data block includes an identifier indicating a unique priority, and each of said line circuits comprise:

means for detecting the priority of the data block; and means for generating said proceed-to-send request when the detected priority is equal to or higher than a reference priority, and wherein said control means includes means for recyclically varying the level of said reference priority when there are no proceed-to-send requests.

8. A time division switching system, comprising:

a plurality of line circuits respectively associated with terminal stations, each of said line circuits being made capable of generating a service request, a destination address, in response to a request for communication from the associated terminal station, and a proceed-to-send request which continuously persists in the presence of a variable length data block received from the associated terminal station, each of said line circuits being identified by a unique address;

path establishing means connected to said line circuits;

a read/write memory;

a common bus; and control means for generating a first path selection signal in response to the address of a source line circuit, for supplying said first path selection signal to said path establishing means to cause a path to be established between said memory and said source line circuit through said common bus to allow a destination address to be stored in said memory, for granting said proceed-to-send requests according to priorities assigned to said line circuits, for recalling the destination address from said memory as a function of the address of the source line circuit, for generating a second path selection signal in accordance with the address of the source line circuit and the recalled destination address, and for supplying said second path selection signal to said path establishing means to cause a path to be established via said common bus between said source line circuit and a destination line circuit.

9. A time division switching system as claimed in claim 8, wherein said control means comprises:

a source address memory for storing the address of said line circuits, said source address memory having first and second groups of input terminals, said first group of input terminals being respectively connected to said line circuits, each of said line circuits providing one of two logic states to the associated input terminal of said memory as a representation of one of the presence and absence of said proceed-to-send request; and latch means having input terminals respectively connected to output terminals of said source address memory for latching one of said stored addresses recalled from said source address memory, output terminals of said latch means being respectively connected to the second group of input terminals of said source address memory, said source address memory being responsive to a sum of a digital value given by logic states of said second group of input terminals and a digital value given by logic states of said first group input terminals for recalling an address therefrom.

10. A time division switching system as claimed in claim 8, wherein said line circuits are assigned equal priorities and said control means grants permission to a proceed-to-send request generated by any of said line circuits without interrupting existing paths established by said path establishing means.

11. A time division switching system as claimed in claim 8, wherein said line circuits are assigned equal priorities and said control means grants permission to a proceed-to-send request generated by any of said line circuits for a predetermined fixed duration of time by interrupting an existing path establishing by said path establishing means.

12. A time division switching system as claimed in claim 8, wherein said line circuits are assigned different priorities and said control means grants permission to a proceed-to-send request generated by a line circuit which is assigned higher priority by interrupting an existing path established by said path establishing means to another line circuit which is assigned lower priority.

13. A time division switching system as claimed in claim 8, wherein certain of said line circuits comprise means for generating a switching signal, and wherein said control means includes:
  memory means for storing destination addresses of two or more of said line circuits in response to a service request generated by one of said certain line circuits; and
  means for selectively recalling said destination addresses from said memory means in response to said switching signal in the presence of a proceed-to-send request generated by said one of said certain line circuits.

14. A time division switching system as claimed in claim 8, wherein said data block includes an identifier indicating a unique priority, and each of said line circuits comprise:
  means for detecting the priority of the data block; and
  means for generating said proceed-to-send request when the detected priority is equal to or higher than a reference priority, and wherein said control means includes means for recyclically varying the level of said reference priority when there are no proceed-to-send requests.

15. A time division switching system, comprising:
  a plurality of terminal stations, each transmitting a variable length data block having an identifier indicating a unique priority and a destination address;
  a plurality of line circuits respectively associated with said terminal stations, each of said line circuits generating a destination address in response to a request for communication from the associated terminal station, detecting the priority of the data block received from the associated terminal station and generating a proceed-to-send request when the detected priority is equal to or higher than a reference priority, said proceed-to-send request continuously persisting in the presence of the received data block, each of said line circuits being identified by a unique address;
  priority control means for recyclically varying a level of said reference priority when there are no proceed-to-send requests;
  selector means for granting said proceed-to-send requests according to priorities assigned to said line circuits, and generating a path selection signal in response to the address of a source line circuit whose request has been granted;
  a common bus; and
  path establishing means responsive to said path selection signal for establishing a first path between said source line circuit and said common bus and responsive to the destination address supplied from said source line circuit for establishing a second path between said common bus and a destination line circuit.

16. A time division switching system as claimed in claim 15, wherein said line circuits are assigned equal priorities and said selector means grants permission to a proceed-to-send request generated by any of said line circuits without interrupting existing paths established by said path establishing means.

17. A time division switching system as claimed in claim 15, wherein said line circuits are assigned equal priorities and said selector means grants permission to a proceed-to-send request generated by any of said line circuits for a predetermined fixed duration of time by interrupting an existing path established by said path establishing means.

18. A time division switching system as claimed in claim 15, wherein said line circuits are assigned different priorities and said selector means grants permission to a proceed-to-send request generated by a line circuit which is assigned higher priority by interrupting an existing path established by said path establishing means to another line circuit which is assigned lower priority.

19. A time division switching system, comprising:
  a plurality of individual access line circuits respectively associated with terminal stations, each of said line circuits being made capable of generating a service request and a destination address in response to a request for communication from the associated terminal station, each of said line circuits being identified by a unique address;
  a read/write memory;
  control means responsive to said service request for storing the address of the line circuit requesting service and the destination address into said memory, for recalling said source and destination addresses from said memory at periodic intervals and for generating a path selection signal in response to the recalled addresses;
  a common bus;
  first path establishing means connected to said common bus and said individual access line circuits, said first path establishing means being responsive to said path selection signal for establishing a path through said common bus between individual access line circuits;
  a plurality of multiple access line circuits respectively associated with terminal stations;
  means for detecting when said common bus is idle; and
  second path establishing means connected to said common bus and said multiple access line circuits, said second path establishing means being responsive to said bus idle detection to establish a first path from one of said multiple access line circuits to said common bus and a second path from said common bus to another multiple access line circuit.

20. A time division switching system as claimed in claim 19, wherein each of said multiple access line circuits includes means for detecting a data block in error and for transmitting a copy of the data block upon error detection.

21. A time division switching system as claimed in claim 19, wherein each of said multiple access line circuits includes means for generating a destination address and a proceed-to-send request during the presence of a data block received from the associated terminal station, and means for detecting a data block addressed to its own line circuit by examining the destination address received from said common bus, and further comprising:
  means for granting permission to proceed-to-send requests according to prorities assigned to said multiple access line circuits,
  said second path establishing means being responsive to the address of a source multiple access line circuit to which permission has been granted for establishing said first and second paths to allow said destination address to be passed to said another multiple access line circuit.

22. A time division switching system, comprising:
- a first group of line circuits respectively associated with terminal stations, each of said line circuits generating a service request and a destination address in response to a request for communication from the associated terminal station, each of said line circuits being identified by a unique address;
- a first read/write memory;
- first control means responsive to said service request for storing the address of the line circuit requesting service and the destination address in said memory, for recalling said source and destination addresses from said memory at periodic intervals and for generating a first path selection signal in response to the recalled addresses; and
- a common bus;
- first path establishing means connected to said common bus and said first group of line circuits, said first path establishing means being responsive to said first path selection signal for establishing a path through said common bus between said line circuits;
- a second group of line circuits respectively associated with terminal stations, each of said second group of line circuits including means for generating a service request, in response to a request for communication received from an associated terminal station, and a proceed-to-send request during the presence of a data block received from the associated terminal station, each of said second group of line circuits being identified by a unique address;
- a second read/write memory;
- second control means for granting permission to said proceed-to-send requests according to priorities assigned to said second group of line circuits, storing the destination address supplied from a source line circuit of the second group in said second read/write memory in response to the service request, recalling a destination address from said second read/write memory as a function of the address of a source line circuit of said second group, and generating a second path selection signal in response to the destination address recalled from said second read/write memory and the address of the source line circuit of the second group;
- means for detecting when said common bus is idle; and
- second path establishing means connected to said common bus and said second group of line circuits, said second path establishing means being responsive, during the idle status of said common bus, to said second path selection signal to establish a path from said source line circuit of the second group to a destination line circuit of the second group through said common bus.

* * * * *

UNITED STATES PATENT AND TRADEMARK OFFICE
CERTIFICATE OF CORRECTION

PATENT NO. : 4,769,812

DATED : September 6, 1988

INVENTOR(S) : SHIMIZU

It is certified that error appears in the above-identified patent and that said Letters Patent is hereby corrected as shown below:

Col. 3, line 39, delete "circuit 12" insert --circuit 13--

Col. 4, line 63, delete "1" insert --a--

Col. 8, line 59, delete "12" insert --2--.

Signed and Sealed this

Eleventh Day of April, 1989

Attest:

DONALD J. QUIGG

Attesting Officer

Commissioner of Patents and Trademarks